United States Patent
Pai et al.

[11] Patent Number: 6,027,848
[45] Date of Patent: *Feb. 22, 2000

[54] LAYERED PHOTORECEPTORS WITH MULTIPLE TRANSPORT LAYERS

[75] Inventors: Damodar M. Pai, Fairport; William W. Limburg, Penfield, both of N.Y.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/786,469

[22] Filed: Jan. 21, 1997

[51] Int. Cl.$^7$ .......................... G03G 13/22; G03G 5/047
[52] U.S. Cl. ................... 430/125; 430/58.05; 430/58.2; 430/58.7; 430/126
[58] Field of Search .................... 430/58, 59, 66, 430/96, 125, 126, 58.05, 58.2, 58.7, 59.6

[56] References Cited

U.S. PATENT DOCUMENTS

| | | | |
|---|---|---|---|
| 4,618,551 | 10/1986 | Stolka et al. | 430/58.2 |
| 4,801,517 | 1/1989 | Frechet et al. | 430/58.6 |
| 4,806,443 | 2/1989 | Yanus et al. | 430/56 |
| 4,806,444 | 2/1989 | Yanus et al. | 430/56 |
| 4,818,650 | 4/1989 | Limburg et al. | 430/56 |
| 4,889,784 | 12/1989 | Champ et al. | 430/58.45 |
| 4,935,487 | 6/1990 | Yanus et al. | 528/203 |
| 4,956,440 | 9/1990 | Limburg et al. | 528/99 |
| 5,028,687 | 7/1991 | Yanus et al. | 528/203 |
| 5,030,532 | 7/1991 | Limburg et al. | 430/56 |
| 5,055,366 | 10/1991 | Yu et al. | 430/58.8 |
| 5,283,143 | 2/1994 | Yanus et al. | 430/58.6 |
| 5,310,613 | 5/1994 | Pai et al. | 430/58.6 |
| 5,409,792 | 4/1995 | Yanus et al. | 430/58.6 |
| 5,591,554 | 1/1997 | Mishra et al. | 430/58.65 |
| 5,614,341 | 3/1997 | Mishra et al. | 430/58.65 |

Primary Examiner—Janis L. Dote

[57] ABSTRACT

An electrophotographic imaging member including a supporting substrate; an optional charge blocking layer; an optional adhesive layer; a charge generating layer and at least two charge transport layers, each charge transport layer including a charge transporting polymer (a) including a backbone containing charge transporting moieties in the backbone, the moieties having a chemical structure different from the chemical structure of charge transporting moieties in the charge transport polymer of any charge transport layer lying closer to the charge generating layer, and (b) having a higher ionization potential than the charge transport polymer in any charge transport layer lying closer to the charge generating layer. This imaging member may be employed in an electrophotographic imaging process, particularly in high sensitivity infrared photoreceptors which are compatible with liquid ink development processes.

17 Claims, No Drawings

LAYERED PHOTORECEPTORS WITH MULTIPLE TRANSPORT LAYERS

BACKGROUND OF THE INVENTION

This invention relates in general to electrophotographic imaging members and more specifically, to imaging members comprising charge generator layers and multiple charge transport layers containing charge transporting polymers.

Electrophotographic imaging members, i.e. photoreceptors, typically include a photoconductive layer formed on an electrically conductive substrate. The photoconductive layer is a good insulator in the dark so that electric charges are retained on its surface. Upon exposure to light, the charge is dissipated.

An electrostatic latent image is formed on the photoreceptor by first uniformly depositing an electric charge over the surface of the photoconductive layer by one of any suitable means well known in the art. The photoconductive layer functions as a charge storage capacitor with charge on its free surface and an equal charge of opposite polarity (the counter charge) on the conductive substrate. A light image is then projected onto the photoconductive layer. On those portions of the photoconductive layer that are exposed to light, the electric charge is conducted through the layer reducing the surface charge. The portions of the surface of the photoconductive not exposed to light retain their surface charge. The quantity of electric charge at any particular area of the photoconductive surface is inversely related to the illumination incident thereon, thus forming an electrostatic latent image.

The photodischarge of the photoconductive layer requires that the layer photogenerate conductive charge and transport this charge through the layer thereby neutralizing the charge on the surface. Two types of photoreceptor structures have been employed: multilayer structures wherein separate layers perform the functions of charge generation and charge transport, respectively, and single layer photoconductors which perform both functions. These layers are formed on an electrically conductive substrate and may include an optional charge blocking and an adhesive layer between the conductive layer and the photoconducting layer or layers. Additionally, the substrate may comprise a non-conducting mechanical support with a conductive surface. Other layers for providing special functions such as incoherent reflection of laser light, dot patterns for pictorial imaging or subbing layers to provide chemical sealing and/or a smooth coating surface may be optionally be employed.

One common type of photoreceptor is a multilayered device that comprises a conductive layer, an optional blocking layer, an optional adhesive layer, a charge generating layer, and a charge transport layer. The charge transport layer can contain an active aromatic diamine molecule, which enables charge transport, dissolved or molecularly dispersed in a film forming binder. This type of charge transport layer is described, for example in U.S. Pat. No. 4,265,990. Other charge transport molecules disclosed in the prior art include a variety of electron donor, aromatic amines, oxadiazoles, oxazoles, hydrazones and stilbenes for hole transport and electron acceptor molecules for electron transport. Another type of charge transport layer has been developed which utilizes a charge transporting polymer wherein the charge transporting moiety is incorporated in the polymer as a group pendant from the backbone of the polymer backbone or as a moiety in the backbone of the polymer. These types of charge transport polymers include materials such as poly(N-vinylcarbazole), polysilylenes, and others including those described, for example, in U.S. Pat. No. 4,618,551, U.S. Pat. No. 4,806,443, U.S. Pat. No. 4,806,444, U.S. Pat. No. 4,818,650, U.S. Pat. No. 4,935,487, and U.S. Pat. No. 4,956,440. The disclosures of these patents are incorporated herein in their entirety.

Charge generator layers comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge generator layers may also comprise inorganic pigments of crystalline selenium and its alloys; Group II–VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers utilizing infrared exposure systems. Infrared sensitivity is required for photoreceptors exposed to low cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, magnesium phthalocyanine and metal-free phthalocyanine. The phthalocyanines exist in many crystal forms which have a strong influence on photogeneration.

One of the design criteria for the selection of the photosensitive pigment for a charge generator layer and the charge transporting molecule for a transport layer is that, when light photons photogenerate holes in the pigment, the holes be efficiently injected into the charge transporting molecule in the transport layer. More specifically, the injection efficiency from the pigment to the transport layer should be high. A second design criterion is that the injected holes be transported across the charge transport layer in a short time; shorter than the time duration between the exposure and development stations in an imaging device. The transit time across the transport layer is determined by the charge carrier mobility in the transport layer. The charge carrier mobility is the velocity per unit field and has dimensions of $cm^2$/volt sec. The charge carrier mobility is a function of the structure of the charge transporting molecule, the concentration of the charge transporting molecule in the transport layer and the electrically "inactive" binder polymer in which the charge transport molecule is dispersed. It is believed that the injection efficiency can be maximized by choosing a transport molecule whose ionization potential is lower than that of the pigment. However, low ionization potential molecules may have other deficiencies, one of which is their instability in an atmosphere of corona effluents. A copy quality defect resulting from the chemical interaction of the surface of the transport layer with corona effluents is referred to as "parking deletion" and is described in detail below.

Reprographic machines often utilize multilayered organic photoconductors and also employ corotrons or scorotrons to charge the photoconductors prior to imagewise exposure. During the operating lifetime of these photoconductors they are subjected to corona effluents which include ozone, various oxides of nitrogen etc. It is believed that some of these oxides of nitrogen are converted to nitric acid in the presence of water molecules present in the ambient operating atmosphere. The top surface of the photoconductor is exposed to the nitric acid during operation of the machine and photoconductor molecules at the very top surface of the transport layer are converted to what is believed to be the nitrated species of the molecules and these could form an electrically conductive film. However, during operation of the machine, the cleaning subsystem continuously removes (by wear) a region of the top surface thereby preventing accumulation of the conductive species. However, such is not the case when the machine is not operating (i.e. in idle mode) between two large copy runs. During the idle mode between long copy runs of, for example, 1000 copies, a specific segment of the photoreceptor comes to rest (is parked) beneath a corotron that had been in operation during the long copy run. Although the high voltage to the corotron is turned off during the time period when the photoreceptor is parked, some effluents (e.g. nitric acid, etc.) continue to be emitted from the corotron shield, corotron housing, etc. This effluent emission is concentrated in the region of the stationary photoreceptor parked directly underneath the corotron. The effluents render that surface region electrically conductive. When machine operation is resumed for the next copy run, a loss of resolution, and even deletion, is observed in the affected region. Thus, the corona induced changes primarily occur at the surface region of the charge transport layer. These changes are manifested in the form of increased conductivity which results in loss of resolution of the final toner images. In the case of severe increases in conductivity, there can be regions of severe deletions in the images. The problem of deletion sometimes manifests itself as a loss of resolution when the reprographic machine operates in an extended run of 1000 cycles or more. The onset of loss of resolution depends on the type and number of corotrons employed and the air-flow configuration within the machines.

One technique to obtain a highly sensitive and yet more corona stable photoreceptor is to have several transport layers with progressively increasing ionization potentials. The material with the lowest ionization potential is coated first, closest to the generator layer and transport layer with the highest ionization potential is coated last, near the free surface of the device. In this structure, the injection from the generator layer is still maintained at a high value because of the low ionization potential transport molecule closest to the generator layer. The hole injected into the first transport layer drifts through that layer and is injected into the second transport layer with slightly higher ionization potential and so on. By the proper selection of the materials, the difference in ionization potential between adjacent transport layers is held to a minimum, to prevent an injection barrier between transport layers. This scheme ought to result in a device with very high sensitivity and yet be stable in a corona environment. A representative device appears to be described in U.S. Pat. No. 4,889,784. If the transporting species are donor molecules, this scheme would require different classes of materials for the different transport layers. The ionization potentials of different classes of material such as diamine, stillbene and hydrazone are different and the ionization potentials can be changed further by the proper selection of substituent groups. However, the multi-transport layer scheme is not feasible with the small molecule transport layers because of intermixing between transport layers during the coating process resulting in migration of the molecule from the second transport layer into the first transport layer and so on with each additionally deposited layer.

It has also been found that photoreceptors containing an active aromatic diamine small molecule charge transport compound dissolved or molecularly dispersed in a film forming binder become unstable when employed with liquid development systems. These photoreceptors suffer from cracking, crazing, extraction, phase separation and crystallization of charge transporting active compounds by contact with the organic carrier fluid in a machine employing a liquid development system. A commonly employed organic carrier fluid in liquid development systems is an isoparaffinic hydrocarbon, for example, Isopar® available from Exxon Chemicals International, Inc. The leaching and crystallization of charge transporting active compounds markedly degrades the mechanical integrity and electro-optical performance of the photoreceptors. More specifically, the organic carrier fluid of a liquid developer leaches out activating small molecules, such as the arylamine containing compounds typically used in the charge transport layers. Representative of this class of materials are: N,N'- diphenyl-N,N'-bis (3-methylphenyl)-[1,1'-biphenyl]-4,4'-diamine; bis-(4-diethylamino-2-methylphenyl)-phenylmethane; 2,5-bis-(4'-diethylamino phenyl)-1,3,4-oxadiazole; 1-phenyl-3-(4'-diethylaminostyryl)-5-(4"-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenylamino phenyl)-ethylene and the like. The leaching process results in crystallization of the charge transporting activating small molecules, such as the aforementioned arylamine compounds, onto the photoreceptor surface and subsequent migration of the arylamine into the liquid developer ink. In addition, the ink vehicle, typically a $C_{10}$–$C_{14}$ branched hydrocarbon, induces the formation of cracks and crazes in the photoreceptor leading to the onset of copy defects and shortened photoreceptor life. Sufficient degradation can occur in less than eight hours of use making these photoreceptors unsuitable for use in machines employing liquid developers.

INFORMATION DISCLOSURE STATEMENT

U.S. Pat. No. 4,889,784 to Champ et al., issued on Dec. 26, 1989—An organic photoconductor is disclosed comprising a charge generation layer and and on top thereof a charge transport layer having a higher concentration of charge transport molecules nearer the charge generation layer than in the topmost portion.

U.S. Pat. No. 4,806,443 to Yanus et al., issued Feb. 21, 1989—An electrophotographic imaging member and an electrophotographic process are disclosed in which the imaging member comprises a polymeric arylamine compound represented by a specific formula. The imaging member may comprise a substrate, charge generation layer and a charge transport layer. Activating small molecules such arylamine containing compounds are disclosed, for example, in columns 2 through 4. Part or all of the transport material comprising a hole transporting small molecule in an inactive binder to be employed in a transport layer may be replaced by active polymeric acrylamine compounds as disclosed, for example, in column 17, lines 45 through 55.

U.S. Pat. No. 4,818,650 to Limburg et al, issued Apr. 4, 1989—An electrostatographic imaging member and electrostatographic imaging process are disclosed in which the imaging member comprises a polymeric arylamine compound represented by a specific formula. Various activating small molecules are described, for example, in columns 2 through 4. Polymeric arylamine molecules are mentioned in column 3. Part or all of the transport material comprising a hole transporting small molecule in an inactive binder or a transport may be replaced by a polymeric arylamine film forming material as described, for example, in column 26, lines 11 through 21.

U.S. Pat. No. 4,806,444 to Yanus et al., issued Feb. 21, 1989—An electrostatographic imaging member and electrostatographic imaging process are disclosed in which the imaging member comprises a polymeric arylamine compound represented by a specific formula. Various activating small molecule materials are described, for example in columns 2 through 4. Also, polymeric arylamine compounds are mentioned in column 3. Parts or all of the transport material comprising a hole transporting small molecule in an inactive binder for a transport layer may be replaced by active polymeric arylamine compounds as described, for example, in column 17, lines 23 through 33.

U.S. Pat. No. 4,935,487 to Yanus et al., issued Jun. 19, 1990—A polymeric arylamine having a specific formula is disclosed. Various activating small molecule materials such as arylamine compounds are described, for example in columns 2 through 4. Polymeric arylamine molecules are mentioned in column 3. Part or all of the transport material comprising a hole transporting small molecule in an inactive binder for a transport layer may be replaced by active polymeric arylamine film forming material as described, for example, in column 16, lines 20 through 30.

U.S. Pat. No. 4,956,440 to Limburg et al., issued Sep. 11, 1990—Polymeric tertiary arylamine compounds of the phenoxy resin type are disclosed for electrophotographic imaging. Various activating small molecule materials such as arylamine compounds are described, for example in columns 2 through 4. Polymeric arylamine molecules are mentioned in column 3. Part or all of the transport material comprising a hole transporting small molecule in an inactive binder for a transport layer may be replaced by polymeric tertiary arylamine compounds of the phenoxy resin type as described, for example, in column 24, lines 44 through 54.

U.S. Pat. No. 4,801,517 to Frechet et al., issued Jan. 31, 1989—An electrostatographic imaging member and electrostatographic process are disclosed in which the imaging member comprises a polymeric arylamine compound having a specific formula. Various activating small molecule materials such as arylamine compounds are described, for example in columns 2 through 4. Polymeric arylamine molecules are mentioned in column 3. Part or all of the transport material comprising a hole transporting small molecule in an inactive binder for a transport layer may be replaced by the polymeric amine compound, e.g., see column 17, lines 1 through 1 1.

U.S. Pat. No. 5,028,687 to Yanus et al., issued Jul. 2, 1991—A polymeric arylamine having a specific formula is disclosed. The material is useful in fabricating a charge transport layer of photosensitive members, for example in Example V, column 21, line 21.

U.S. Pat. No. 5,030,532 to Limburg et al, issued Jul. 9,1991—A polymeric arylamine having a specific formula is disclosed. The material is useful in fabricating a charge transport layer of photosensitive members.

U.S. Pat. No. 5,283,143 to Yanus et al., issued Feb. 1, 1994—Arylamine terpolymers with $CF_3$ substituted moieties are disclosed.

U.S. Pat. No. 5,310,613 to Pai et al., issued May 10, 1994—An electrophotographic imaging member is disclosed including a charge generating layer containing oxytitanium phthalocyanine polymorph and a charge transport layer containing a film forming charge transporting polymer including charge transporting moieties in the backbone of the film forming charge transporting polymer, for example polysilylenes and polyarylamine derivatives.

U.S. Pat. No. 5,409,792 to Yanus et al., issued Apr. 25,1995—An electrophotographic imaging member including a charge generating layer and a charge transport layer comprising a charge transporting small molecule dissolved or molecularly dispersed in a film forming charge transporting polymer comprising charge transporting moieties in the backbone of the film forming charge transporting polymer, the charge transporting moieties having a structure unlike the the structure of the charge transporting molecule.

CROSS REFERENCE TO COPENDING APPLICATION

In copending application Ser. No. 07/812,530 which is now U.S. Pat. No. 5,830,614, to Pai et al., entitled "Multi-layer Organic Photoreceptor Employing A Dual Layer of Charge Transporting Polymers", filed Dec. 20, 1991—A charge transport dual layer is disclosed for use in a multi-layer photoreceptor comprising a support layer, a charge generating layer and a charge transport dual layer including a first transport layer containing a charge-transporting polymer, and a second transport layer containing a charge-transporting polymer having a lower weight percent of charge transporting segments than the charge-transporting polymer in the first transport layer. This structure has greater resistance to corona effects and provides for a longer service life. The charge-transporting polymers preferably comprise polymeric arylamine compounds.

SUMMARY OF THE INVENTION

It is, therefore, an object of the present invention to provide an improved electrophotographic imaging member which overcomes the above-noted disadvantages.

It is another object of the present invention to provide an electrophotographic imaging member which avoids crystallization when operated in an environment employing liquid ink development.

It is still another object of the present invention to provide an electrophotographic imaging member exhibiting improved imaging characteristics during extended image cycling.

It is yet another object of the present invention to provide an electrophotographic imaging member which is very sensitive and yet very stable when operated in a corona environment.

The foregoing objects and others are accomplished in accordance with this invention by providing an electrophotographic imaging member including a supporting substrate; an optional charge blocking layer; an optional adhesive layer; a charge generating layer and at least two charge transport layers, each charge transport layer including a charge transporting polymer (a) including a backbone containing charge transporting moieties in the backbone, the moieties having a chemical structure different from the chemical structure of charge transporting moieties in the charge transport polymer of any charge transport layer lying closer to the charge generating layer, and (b) having a higher ionization potential than the charge transport polymer in any charge transport layer lying closer to the charge generating layer. This imaging member may be employed in an electrophotographic imaging process.

Electrostatographic imaging members are well known in the art. Electrostatographic imaging members may be prepared by any suitable technique. Typically, a flexible or rigid substrate is provided having an electrically conductive surface. A charge generating layer is then applied to the electrically conductive surface. A charge blocking layer may be applied to the electrically conductive surface prior to the application of a charge generating layer. If desired, an adhesive layer may be utilized between the charge blocking layer and the charge generating layer. Usually the charge generation layer is applied onto the blocking layer and a charge transport layer is formed on the charge generation layer. However, in some embodiments, the charge transport layer is applied prior to the charge generation layer.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which may be rigid or flexible. The electrically insulating or conductive substrate may be in the form of an endless flexible belt, a web, a rigid cylinder, a sheet and the like.

The thickness of the substrate layer depends on numerous factors, including strength desired and economical considerations. Thus, this layer for a flexible belt may be of substantial thickness, for example, about 125 micrometers, or of minimum thickness less than 50 micrometers, provided there are no adverse effects on the final electrostatographic device.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 Angstrom units to about 750 Angstrom units, and more preferably from about 100 Angstrom units to about 200 Angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. In general, a continuous metal film can be attained on a suitable substrate, e.g. a polyester web substrate such as Mylar available from E. I. du Pont de Nemours & Co. with magnetron sputtering.

If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. A typical electrical conductivity for conductive layers for electrophotographic imaging members in slow speed copiers is about $10^2$ to $10^3$ ohms/square centimeter.

After formation of an electrically conductive surface, an optional charge blocking layer or barrier layer may be applied thereto for photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethyl-ethylamino)titanate, titanium-4-amino benzene sulfonate oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. The blocking layer should be continuous and have a thickness of less than about 0.2 micrometer because greater thicknesses may lead to undesirably high residual voltage. A charge blocking layer is normally not employed when the charge transport layer is located between the substrate and the charge generating layer.

An optional adhesive layer may applied to the hole blocking layer or conductive layer. Any suitable adhesive layer well known in the art may be utilized. Typical adhesive layer materials include, for example, polyesters, duPont 49,000 (available from E. I. duPont de Nemours and Company), Vitel PE100 (available from Goodyear Tire & Rubber), polyurethanes, and the like. Satisfactory results may be achieved with adhesive layer thickness between about 0.05 micrometer (500 Angstroms) and about 0.3 micrometer (3,000 Angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infrared radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Multi-photogenerating layer compositions may be utilized where a photoconductive layer enhances or reduces the properties of the photogenerating layer. Examples of this type of configuration are described in U.S. Pat. No. 4,415,639, the disclosure of this patent being incorporated herein by reference in its entirety. Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers. Other organic polymeric film forming binders include charge transporting polymers for example polyether carbonates as disclosed for example in U.S. Pat. Nos. 4,801,517, 4,806,443, 4,806,444, 4,818,650 and 5,030,532 and polysilylenes as disclosed for example in U.S. Pat. No. 4,839,451 and U.S. Pat. No. 4,618,551, the disclosures of which are incorporated herein by reference in their entirety.

The photogenerating composition or pigment is present in the resinous binder composition in various amounts, generally, however, from about 10 percent by volume to about 90 percent by volume of the photogenerating pigment is dispersed in about 90 percent by volume to about 10 percent by volume of the resinous binder, and preferably from about 20 percent by volume to about 40 percent by volume of the photogenerating pigment is dispersed in about 80 percent by volume to about 60 percent by volume of the resinous binder composition. The charge generating layer may comprise between about 5 percent by weight and about 95 percent by weight of a charge generating pigment, based on the total weight of the charge generating layer.

The photogenerating layer containing photoconductive pigments and the resinous binder material generally ranges in thickness of of between about 0.05 micrometer and about 10 micrometers from about 0.1 micrometer to about 5 micrometers, and preferably has a thickness of from about 0.2 micrometer to about 1 micrometer. The photogenerating layer thickness is related to binder content. Higher binder content compositions generally require thicker layers for photogeneration. Thicknesses outside these ranges can be selected providing the objectives of the present invention are achieved.

While there is no particular restriction on the mixing ratio between the pigment and the binder polymer, the binder polymer is generally used in an amount from 5 to 500 parts by weight, preferably, from 10 to 50 parts by weight based on 100 parts by weight of the oxytitanium phthalocyanine compound.

Any suitable charge transporting polymer having active moieties incorporated in the backbone of the polymer whereby the charge is transported through the active moieties incorporated in the backbone of the polymer. Preferably, two distinct classes of charge transporting polymers having active moieties incorporated in the backbone of the polymer are utilized in the charge transporting layer of this invention. The first is a class of condensation polymers containing arylamine compounds incorporated in the back bone and the second class is polysilylenes. These electrically active charge transporting polymeric materials should be capable of supporting the injection of photogenerated holes from the charge generation material and capable of allowing the transport of these holes therethrough. In both these classes of polymers charges are transported through the backbone of the polymer. Particularly preferred charge transport polymers are poly(arylamine carbonate) compounds and polysilylenes. The expression "charge transporting moieties" of the film forming charge transporting polymer as employed herein is defined as one of the "active" units or segments that support charge transport. Typical charge transporting polymers of the first class of condensation polymers containing arylamine compounds incorporated in the back bone include arylamine compounds are represented by the formula:

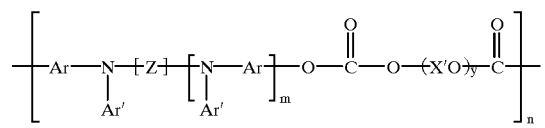

wherein m is 0 or 1, y is 1, 2, or 3 n is between about 5 and about 5,000,

Z is selected from the group consisting of:

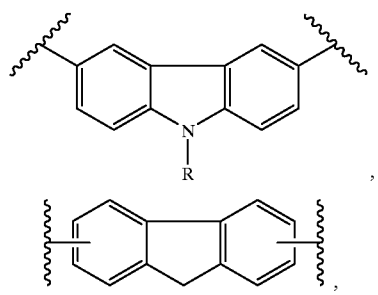

-continued

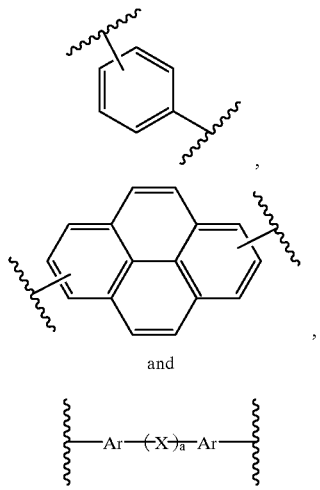
and $\{-Ar-(X)_a-Ar-\}$ a is 0 or 1, Ar is selected from the group consisting of:

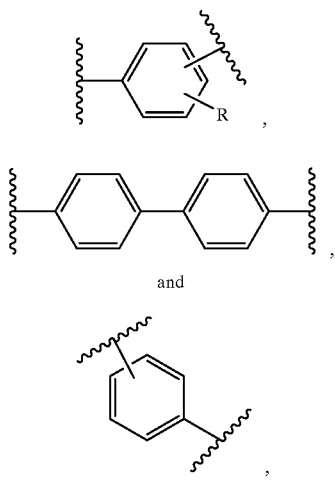

R is an alkyl radical selected from the group consisting of alkyl and iso-alkyl groups containing 2 to 10 carbon atoms, Ar' is selected from the group consisting of:

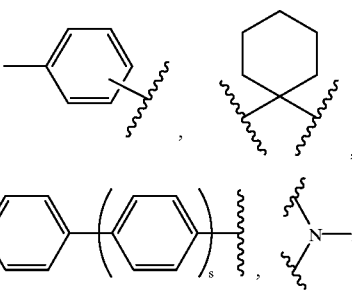

X is selected from the group consisting of:

—CH$_2$—,  —C(CH$_3$)$_2$—,  —O—,  —S—,

[structures]

s is 0, 1 or 2, and

X' is an alkylene radical selected from the group consisting of alkylene and alkylene groups containing 2 to 10 carbon atoms.

A typical charge transporting polymer represented by the above formula is:

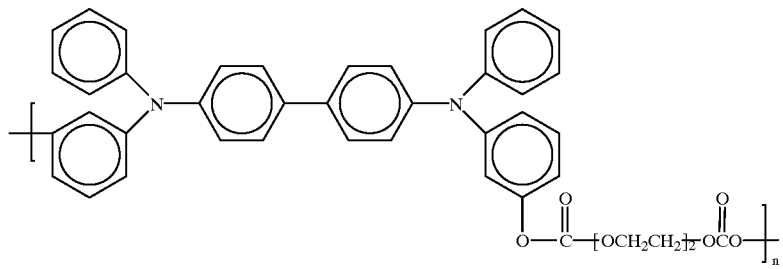

wherein the value of n is between about 10 and about 1,000. This and other charge transporting polymers represented by the above generic formula are described in U.S. Pat. No. 4,806,443, the entire disclosure thereof being incorporated herein by reference.

Other typical charge transporting polymers include arylamine compounds represented by the formula:

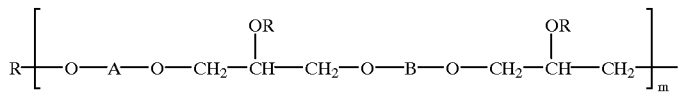

wherein:

R is selected from the group consisting of —H, —CH₃, and —C₂H₅;

m is between about 4 and about 1,000; and

A is selected from the group consisting of an arylamine group represented by the formula:

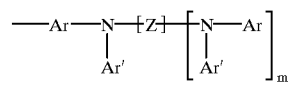

wherein:

m is 0 or 1,

Z is selected from the group consisting of:

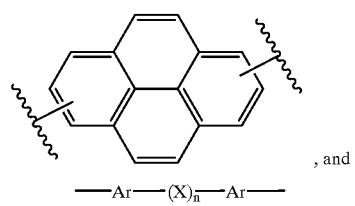, and

—Ar—(X)ₙ—Ar—

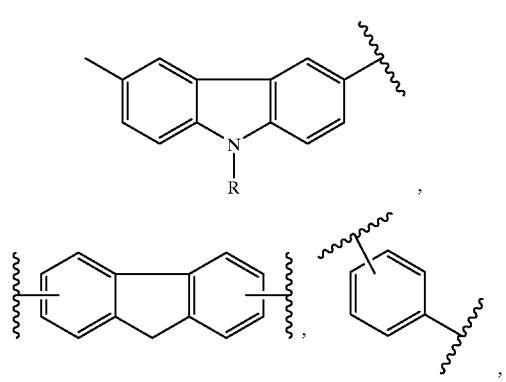

wherein:

n is 0 or 1,

Ar is selected from the group consisting of:

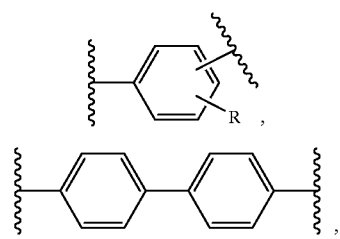

-continued and 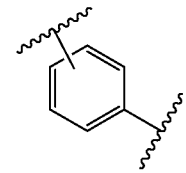, wherein:

R is selected from the group consisting of —CH₃, —C₂H₅, —C₃H₇, and —C₄H₉,

Ar' is selected from the group consisting of:

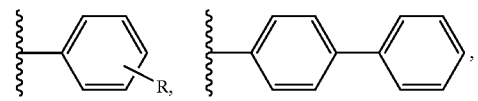

and 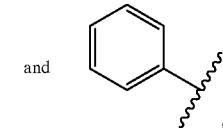,

X is selected from the group consisting of:

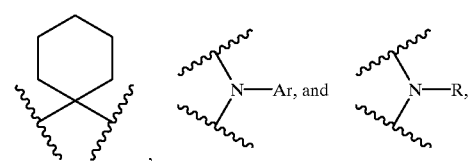

B is selected from the group consisting of:

the arylamine group as defined for A, and

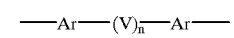

wherein Ar is as defined above, and V is selected from the group consisting of:

—CH₂—, —C(CH₃)₂—, —O—, —S—,

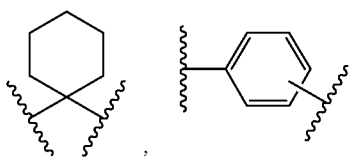

and n is 0 or 1

Specific examples include:

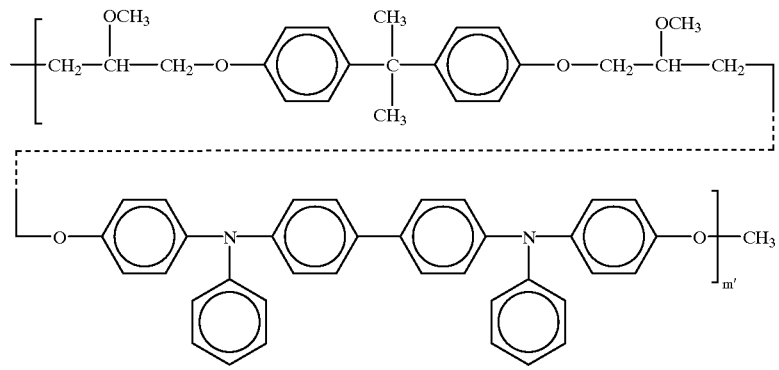

where the value of m' was between about 18 and about 19 and where the value of m" was between about 4 and about 5. These and other charge transporting polymers represented by the above generic formula are described in U.S. Pat. No. 4,818,650 and U.S. Pat. No. 4,956,440, the entire disclosures thereof being incorporated herein by reference.

An example of still other typical charge transporting polymers is:

wherein the value of m' was between about 10 and about 50. This and other related charge transporting polymers are described in U.S. Pat. No. 4,806,444 and U.S. Pat. No. 4,956,487, the entire disclosures thereof being incorporated herein by reference.

Other examples of typical charge transporting polymers are:

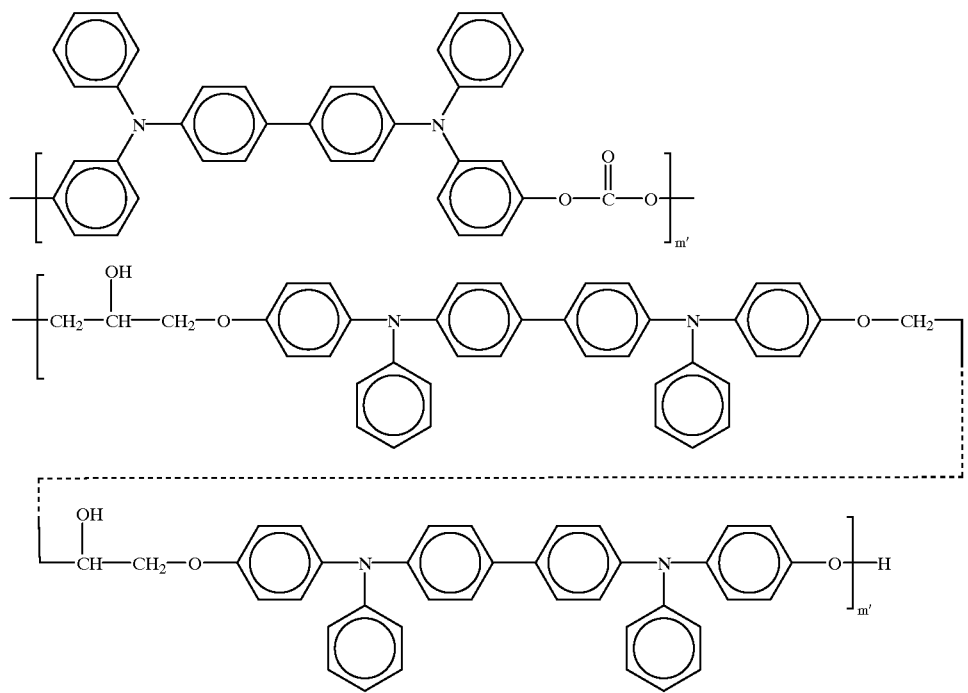

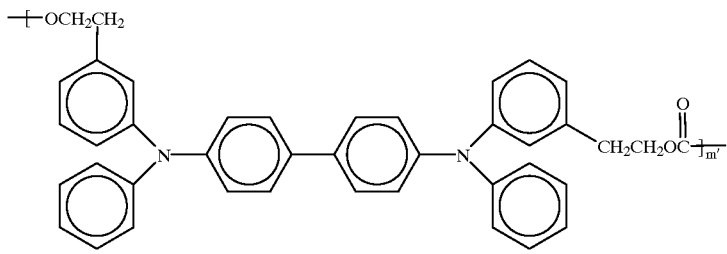

wherein m' is between about 10 and about 10,000 and

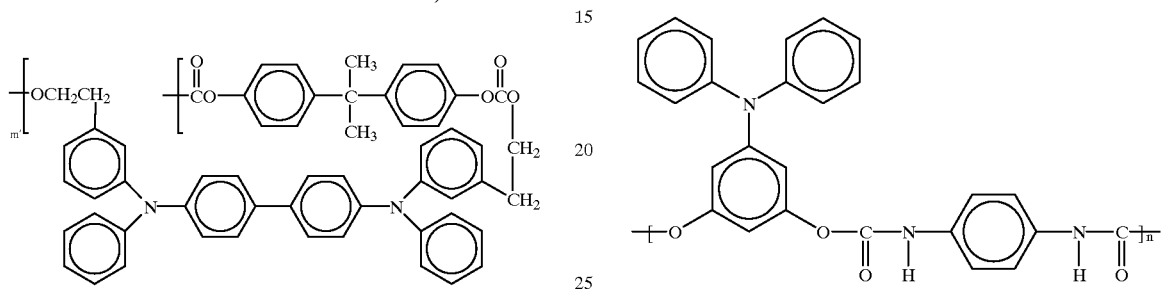

wherein m' is between about 10 and about 1,000. Related charge transporting polymers include copoly [3,3'bis(hydroxyethyl)triphenylamine/bisphenol A]carbonate, copoly [3,3'bis(hydroxyethyl)tetraphenylbezidine/bisphenol A]carbonate, poly[3,3'bis(hydroxyethyl) tetraphenylbenzidine]carbonate, poly [3,3'bis(hydroxyethyl) triphenylamine]carbonate, and the like. These charge transporting polymers are described in U.S. Pat. No. 4,401,517, the entire disclosure thereof being incorporated herein by reference.

Further examples of typical charge transporting polymers include:

where n is between about 5 and about 5,000;

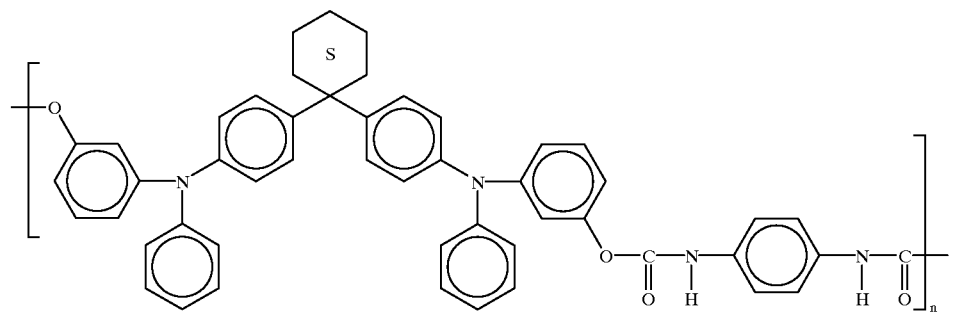

where n represents a number sufficient to achieve a weight average molecular weight of between about 20,000 and about 500,000;

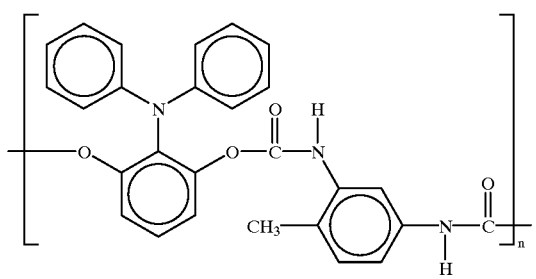

where n represents a number sufficient to achieve a weight average molecular weight of between about 20,000 and about 500,000; and

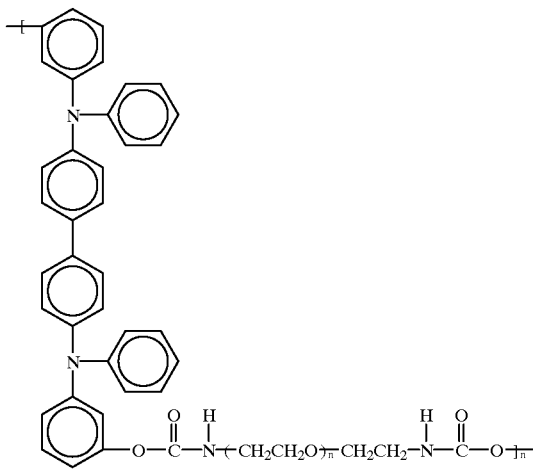

where n represents a number sufficient to achieve a weight average molecular weight of between about 20,000 and about 500,000. These and other related charge transporting polymers are described in U.S. Pat. No. 5,030,532, issued Jul. 9, 1991 the entire disclosure thereof being incorporated herein by reference.

Still other typical charge transporting polymers of the first class of condensation polymers containing arylamine compounds incorporated in the back bone include arylamine compounds are disclosed in U.S. Pat. No. 5,283,143. The entire disclosure of this patent is incorporated herein by reference. This material is useful in fabricating a charge transport layer of photosensitive members and comprises a polyarylamine polymer represented by the following formula:

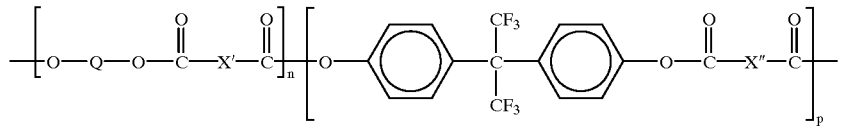

wherein:
n is between about 5 and about 5,000
p is between about 5 and about 5,000
X' and X" are independently selected from a group having bifunctional linkages, and
Q is a divalent group derived from certain hydroxy terminated arylamine reactants.

Another typical charge transporting polymer of the first class of condensation polymers containing arylamine compounds incorporated in the back bone are disclosed in U.S. Pat. No. 5,356,743 to Yanus et al. The entire disclosure of this patent is incorporated herein by reference. This material is also useful in fabricating a charge transport layer of photosensitive members and comprises a polyarylamine polymer represented by the following formula:

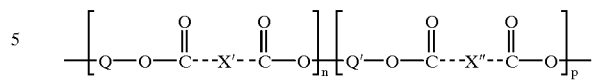

wherein:
n is between about 5 and about 5,000
p is between about 0 and about 5,000
X' and X" are independently selected from a group having bifunctional linkages,
Q is a divalent group derived from certain hydroxy terminated arylamine reactants, and
Q' is a divalent group derived from a hydroxy terminated group.

Another typical charge transporting polymer of the first class of condensation polymers containing arylamine compounds incorporated in the back bone is disclosed in U.S. Pat. No. 5,030,532 issued Jul. 9, 1991 and is represented by the formula:

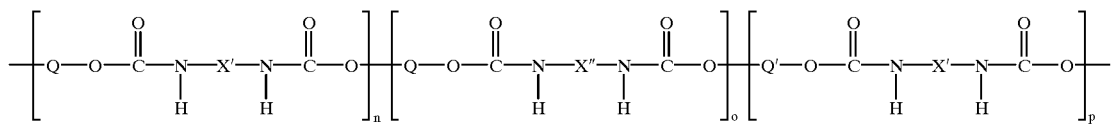

wherein:
n is between about 5 and about 5,000, or 0 if p>0,
o is between about 0 and about 5,000, or is 0 if p>0 or n=0,
p is between about 2 and about 100, or is 0 if n>0,
X' and X" are independently selected from a group having bifunctional linkages,
Q is a divalent group derived from certain hydroxy terminated arylamine reactants,
Q' is a divalent group derived from a hydroxy terminated polyarylamine containing the group defined for Q and having a weight average molecular weight between about 1000 and about 80,000 and the weight average molecular weight of the polyarylamine polymer is between about 10,000 and about 1,000,000. The entire disclosure of U.S. Pat. No. 5,030,532 is incorporated herein by reference.

The second class of charge transporting polymers are represented by the formula:

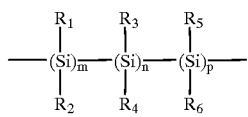

wherein $R_1$, $R_2$, $R_3$, $R_4$, $R_5$, and $R_6$ are independently selected from the group consisting of alkyl, aryl, substituted alkyl, substituted aryl, selected from the group consisting of alkyl aryl, amino aryl and hydroxy aryl, and alkoxy; and m, n, and p are numbers that reflect the percentage of the particular monomer unit in the total polymer composition with the sum of m plus n plus p being equal to 100 percent. Specifically thus, for example, zero percent is less than, or equal to n, and n is less than or equal to 100 percent; and zero percent is less than, or equal to m, and m is less than, or equal to 100 percent; and zero is less than, or equal to p, and p is less than, or equal to 100 percent. Any of the monomer units of the polysilylene can be randomly distributed throughout the polymer, or may alternatively be in blocks of varying lengths.

Some illustrative examples of the polysilylene transport layers include poly(methylphenyl silylene), poly(methylphenyl silylene-co-dimethyl silylene), poly(cyclohexylmethyl silylene), poly(tertiary-butylmethyl silylene), poly(phenylethyl silylene), poly(n-propylmethyl silylene), poly(p-tolylmethyl silylene), poly(cyclotrimethylene silylene), poly(cyclotetramethylene silylene), poly(cyclopentamethylene silylene), poly(di-t-butyl silylene-co-di-methyl silylene), poly(diphenyl silylene-co-phenylmethyl silylene), poly(cyanoethylmethyl silylene), poly(2-acetoxyethyl methylsilylene, poly(2-carbomethoxy methylsilylene), poly(phenyl methyl silylene), which polysilylenes generally have a weight average molecular weight of from about 100,000 to about 2,000,000.

Thus, typical charge transport polymers for multi-transport layer devices include polymeric arylamine compounds and related polymers described in U.S. Pat. No. 4,801,517, U.S. Pat. No. 4,806,444, U.S. Pat. No. 4,818,650, U.S. Pat. No. 4,806,443 and U.S. Pat. No. 5,030,532; polysilylenes; poly N-vinyl carbazole; other polymers including those described in U.S. Pat. No. 4,806,443, U.S. Pat. No. 4,806,444, U.S. Pat. No. 4,818,650, U.S. Pat. No. 4,935,487, and U.S. Pat. No. 4,956,440; and the like. The disclosures of these patents are incorporated herein by reference in their entirety.

As indicated above, each charge transport layer comprises a charge transporting polymer containing charge transporting units in the backbone, these units having a chemical structure different from the chemical structure of charge transporting units in the charge transport polymer of any charge transport layer lying closer to the charge generating layer. The chemical structure of charge transporting units in the backbone of one charge transporting polymer is considered "different" from the chemical structure of charge transporting units in the backbone of another charge transporting polymer when basic or core structural units that transport charge are dissimilar. The chemical structure of charge transporting units in the backbones of the charge transporting layers in different transport layers should be different because transport units have different ionization potentials. Examples of charge transporting moieties having chemical structures different from each other include arylamine containing diamines, hydrazones, oxadiazoles, stillbenes and triphenyl methanes, and the like. Ionization potentials can also be varied by having the same basic structure but different substituent groups. Minor differences, such as the presence of substantially inactive groups such as methyl, ethyl, propyl, isopropyl and butyl groups present on the basic structural unit of the charge transporting moiety of the polymer, do not bring otherwise identical structures within the definition of "different". The presence of groups on the charge transporting moiety of the polymer which significantly raise the ionization potential, for example, electron withdrawing groups, alkoxy groups, and the like, are included within the definition of "different" chemical structures. Typical electron withdrawing groups include nitro groups, cyano, chloro, bromo groups, alkoxy, and the like. Typical electron releasing groups which decrease the ionization potential include dimethylamino, diethylamino, julolydinyl and the like. All of the charge transporting polymers utilized in the charge transport layers of this invention are film forming materials that form continuous solid coatings after removal of any solvent.

As also indicated above, each charge transport layer comprises a charge transporting polymer having a higher ionization potential than the charge transport polymer in any charge transport layer lying closer to the charge generating layer. In other words, the charge transport layers comprise different charge transporting polymers of different ionization potentials with the transporting polymer having the lowest ionization potential being adjacent the generator layer and the charge transporting polymer having the highest ionization potential being in the transport layer farthest away from the generator layer. Thus, for example, the charge transporting polymer with the lowest ionization potential is in the charge transport layer next to the generator layer and the charge transporting polymer with the highest ionization potential is in the transport layer farthest away from the generator layer. The expression "Ionization potential" ($I_p$) as employed herein is defined as the energy required to raise an electron from the highest occupied state to a free state outside the material. Ionization potential may be determined by photo-emission, photo-electron spectroscopy, and the like. Generally, the difference between the ionization potentials of the generator layer pigment and the charge transport polymer of the first transport layer should be less than 0.15 electron volts because ionization potential differences that are greater than 0.15 electron volts between the generator layer pigment and the first transport layer results in an unacceptable injection barrier for the photogenerated holes resulting in a loss of sensitivity. Ionization potential differences greater than 0.15 eV between any two adjacent transport layers results in a barrier to injection which may result in an accumulation of charge at the intersection of two adjacent transport layers resulting a residual potential and cycle-up of the residual potential as the device is subjected to charge-expose -erase cycles required for multi copy runs in electrophotography. The difference between the ionization potentials between charge transport polymers of any two adjacent charge transport layers of at least two charge transport layers is less than about 0.15 electron volts. In other words, it is preferred that charge transport layer immediately adjacent the charge generating layer contains a charge transport polymer having an ionization potential having a value within about 0.15 electron volts of the ionization potential of said generating pigment. The ionization potential of the charge transport polymer in one of at least two charge transport layers on the same side of an adjacent charge generating layer is less than the ionization potential of a transport layer or layers further away from and on the same side of the charge generating layer.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like.

The thickness of each one of the transport layers depends on the number of transport layer utilized with the combined thickness of the transport layers being between about 10 and about 50 micrometers. However, thicknesses outside this range can also be used so long as the imaging performance is not unduly degraded. Preferably, each charge transport layer has a thickness of between about 5 micrometers and about 25 micrometers. The hole transport layer should be continuous and an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1. In other words, the charge transport layer, is substantially non-absorbing to visible light or radiation in the region of intended use but is "active" in that it allows the injection of photogenerated holes from the photoconductive layer, i.e., charge generation layer, and allows these holes to be transported through the active charge transport layer to selectively discharge a surface charge on the surface of the active layer.

Other layers may also be used such as conventional electrically conductive ground strip along one edge of the belt or drum in contact with the conductive layer, blocking layer, adhesive layer or charge generating layer to facilitate connection of the electrically conductive layer of the photoreceptor to ground or to an electrical bias. Ground strips are well known and usually comprise conductive particles dispersed in a film forming binder.

Optionally, an overcoat layer may also be utilized to enhance resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers.

The devices employing the combination of generator layer and polymeric transport layers of this invention exhibit numerous advantages such as extremely high sensitivities combined with the very high corona stabilities. Moreover, high sensitivities are maintained during cycling in a machine employing liquid development systems.

The imaging member of the instant invention may be employed in an electrophotographic imaging process comprising (a) providing an electrophotographic imaging member comprising a supporting substrate; an optional charge blocking layer; an optional adhesive layer; a charge generating layer and at least two charge transport layers, each charge transport layer comprising a charge transporting polymer
  (i) comprising a backbone containing charge transporting moieties in the backbone, the moieties having a chemical structure different from the chemical structure of charge transporting moieties in the charge transport polymer of any charge transport layer lying closer to the charge generating layer, and
  (ii) having a higher ionization potential than the charge transport polymer in any charge transport layer lying closer to the charge generating layer (b) depositing a uniform electrostatic charge on the imaging member;

(c) exposing the imaging member to activating radiation in image configuration to form an electrostatic latent image on the imaging member;

(d) developing the electrostatic latent image with electrostatically attractable marking particles to form a toner image;

(e) transferring the toner image to a receiving member;

(f) cleaning the imaging member; and (g) repeating the depositing, exposing, developing, transferring and cleaning steps.

As previously indicated, photoreceptors containing at least two charge transport layers, each charge transport layer comprising a charge transporting polymer containing chemical groups different from chemical groups in the charge transport polymer in any charge transport layer lying closer to the charge generating layer and which has a higher ionization potential than the charge transport polymer in any charge transport layer lying closer to the charge generating layer have greater stability in systems employing liquid development systems and resist degradation when parked under corona wires following extensive image cycling.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A photoreceptor can be prepared by using a substrate comprising vacuum deposited titanium layer on a polyethylene terephthalate film (Melinex®, available from ICI). The first coating applied to the titanium layer is hydrolyzed gamma aminopropyltriethoxysilane to form a siloxane barrier layer having a thickness of 0.005 micrometer (50 Angstroms). This film can be formed by mixing 3-aminopropyltriethoxysilane (available from PCR Research Chemicals of Florida) in ethanol in a 1:50 volume ratio. The film is applied to a wet thickness of 0.5 mil by a multiple clearance film applicator. The layer can then be allowed to dry for 5 minutes at room temperature, followed by curing for 10 minutes at 110 degrees centigrade in a forced air oven. The second coating can be an adhesive layer of polyester resin (49,000, available from E. I. duPont de Nemours & Co.) formed to a thickness of 0.005 micrometer (50 Angstroms) by applying 0.5 gram of 49,000 polyester resin dissolved in 70 grams of tetrahydrofuran and 29.5 grams of cyclohexanone. The film can be coated using a 0.5 mil bar and curing can be accomplished in a forced air oven for 10 minutes. The next coating is a charge generator layer containing 35 percent by weight vanadyl phthalocyanine photogenerating particles, obtained by the process disclosed in U.S. Pat. No. 4,771,133, dispersed in a polyester resin (Vitel PE100, available from Goodyear Tire and Rubber Co.) applied by conventional coating techniques to form a thickness of 1 micrometer. A transport layer of monomeric diamine can be formed on the generator layer by using a Bird coating applicator to apply a solution containing one gram of N,N'-diphenyl-N,N'-bis(3-methyl-phenyl)-(1, 1'biphenyl)-4,4'-diamine and one gram of polycarbonate resin [poly(4,4'-isopropylidene-diphenylene carbonate (available as Makrolon® from Farbenfabricken Bayer A. G.) dissolved in 11.5 grams of methylene chloride solvent. The N,N'-diphenyl-N,N'-bis(3-methyl-phenyl)-(1,1'biphenyl)-4, 4'-diamine is an electrically active aromatic diamine charge transport small molecule whereas the polycarbonate resin is an electrically inactive film forming binder. The coated device can be dried at 80° C. for half an hour in a forced air oven to form a dry thick charge transport layer having a thickness of about 25 micrometers. When this photoreceptor is used to repeatedly form images with a conventional liquid developer comprising finely divided marking particles dispersed in a liquid carrier of isoparaffinic hydrocarbon (Isopar® available from Exxon Chemicals International, Inc.), the monomeric diamine will be leached out and crystallized by the liquid carrier and the mechanical integrity and electro-optical performance of the photoreceptor will be degraded. Moreover, when parked under a corotron that had been in operation during the long copy run, a region of severe image deletion is expected to occur.

EXAMPLE II

A photoreceptor can be prepared using the same process and same materials described in Example I except that instead of forming a transport layer of monomeric diamine and polycarbonate resin, two transport layers of this invention can be applied to the charge generating layer described in Example I, the two transport layers being formed on one side of the charge generating layer. The first transport layer can be formed by applying a solution containing one gram of a first charge transporting polymer, polyether carbonate resin, dissolved in 11.5 grams of methylene chloride solvent using a 4 mil Bird coating applicator. The polyether carbonate resin can be prepared as described in Example IIIl of U.S. Pat. No. 4,806,443. This polyether carbonate resin is an electrically active charge transporting film forming binder and can be represented by the formula:

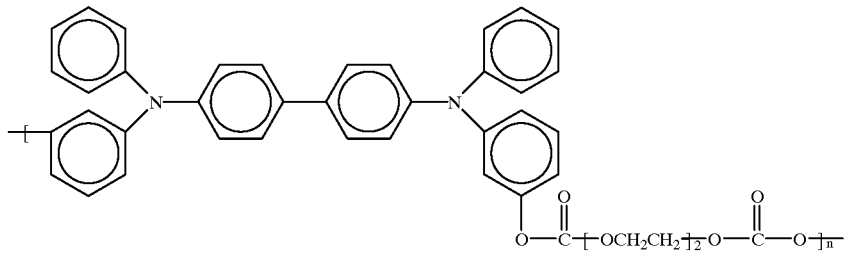

wherein n is about 300 in the above formula so that the molecular weight of the polymer is about 200,000. The film can be dried in a forced air oven at 100° C. for 20 minutes to form a continuous film having a thickness of about 15 micrometers. The difference in ionization potential between the photogenerating particles in the charge generator layer and the ionization potential of the first charge transporting polymer is expected to be less than about 0.15 electron volts. The second transport layer can be formed by applying a solution containing one gram of a second charge transporting film forming polymer, polysilylene, which is believed to have an ionization potential higher than that of the first charge transport polymer with the difference in ionization potential between the first and the second transport layer estimated to be less than 0.15 electron volts, dissolved in 11.5 grams of methylene chloride solvent using a 4 mil Bird coating applicator. This second electrically active charge transporting polymer, polysilylene, can be prepared as described in the Example I of U.S. Pat. No. 4,618,551. Other typical charge transporting polymers are described in U.S. Pat. Nos. 4,401,517, 4,806,444, 4,956,487, 5,030,532 and 5,356,743. This second electrically active charge transporting polymer has a backbone containing charge transporting moieties having a chemical structure different from the chemical structure of charge transporting moieties in the charge transport polymer in the first charge transport layer. The second transport layer can be dried in a forced air oven at 100° C. for 20 minutes to form a continuous film having a thickness of about 15 micrometers. The difference in ionization potential between the photogenerating particles in the charge generator layer and the ionization potential of the first charge transporting polymer is expected to be less than about 0.15 electron volts. When this photoreceptor is used to repeatedly form images with a conventional liquid developer comprising finely divided marking particles dispersed in a liquid carrier of isoparaffinic hydrocarbon (Isopar® available from Exxon Chemicals International, Inc.), the polymeric charge transport materials will not be leached out nor crystallized by the liquid carrier and the mechanical integrity and electro-optical performance of the photoreceptor will not be degraded. Moreover, when parked under a corotron that had been in operation during the long copy run, image deletion is not expected to occur.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. An electrophotographic imaging member comprising a supporting substrate having an electrically conductive surface; an optional charge blocking layer; an optional adhesive layer; a charge generating layer having two sides and at least two charge transport layers formed on one of said sides of the charge generating layer, each charge transport layer comprising a charge transporting polymer (a) comprising a backbone containing charge transporting moieties in said backbone, said moieties having a chemical structure different from the chemical structure of charge transporting moieties in the charge transport polymer of any charge transport layer lying closer to said charge generating layer, and (b) having a higher ionization potential than the charge transport polymer in any charge transport layer lying closer to the charge generating layer.

2. An electrophotographic imaging member according to claim 1 wherein said charge transporting polymer is a polysilylene represented by formula (II),

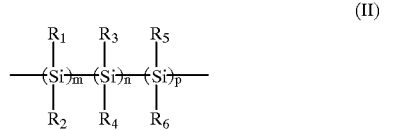
(II)

wherein

R₁, R₂, R₃, R₄, R₅, and R₆ are independently selected from the group consisting of alkyl, aryl, substituted alkyl, substituted aryl selected from the group consisting of alkyl aryl, amino aryl and hydroxy aryl, and alkoxy; and m, n, and p are the percentages of silane monomer units in the total polymer where m+n+p=100 percent;

and wherein said polymer has a weight average molecular weight of from about 100,000 to about 2,000,000.

3. An imaging member according to claim 1 wherein said charge generator layer is between said substrate and said charge transport layers.

4. An electrophotographic imaging member according to claim 1 wherein said charge generator layer has a thickness of between about 0.05 micrometer and about 10 micrometers.

5. An electrophotographic imaging member according to claim 1 wherein each of said charge transport layers has a thickness of between about 5 micrometers and about 25 micrometers.

6. An electrophotographic imaging member according to claim 1 wherein said charge generating layer comprises charge generating pigment dispersed in a resinous binder.

7. An electrophotographic imaging member according to claim 6 wherein said charge generating layer comprises between about 5 percent by weight and about 95 percent by weight of said charge generating pigment, based on the total weight of said charge generating layer.

8. An electrophotographic imaging member according to claim 6 wherein one of said charge transport layers immediately adjacent to said charge generating layer comprises a charge transport polymer having an ionization potential having a value within about 0.15 electron volts of the ionization potential of said generating pigment.

9. An electrophotographic imaging member according to claim 1 wherein the difference between the ionization potentials between charge transport polymers of any two adjacent charge transport layers of said at least two charge transport layers is less than about 0.15 electron volts.

10. An electrophotographic imaging member according to claim 1 wherein one of said charge transporting polymers is represented by formula

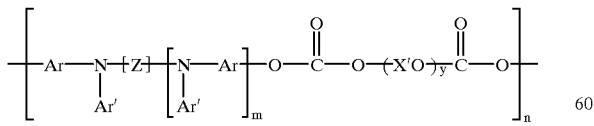

wherein m is 0 or 1, y is 1, 2 or 3, n is between about 5 and about 5,000,

Z is selected from the group consisting of:

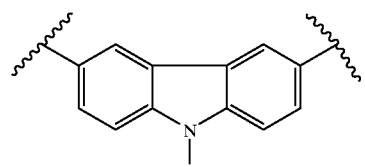

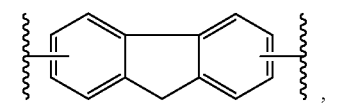

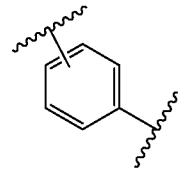

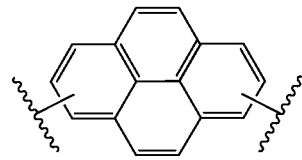

and

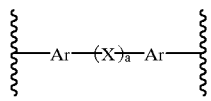

a is 0 or 1,

Ar is selected from the group consisting of:

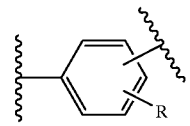

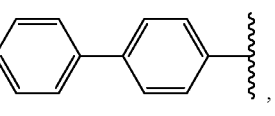

and

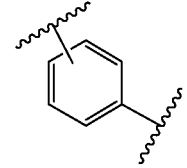

R is an alkyl radical selected from the group consisting of alkyl and iso-alkyl groups containing 2 to 10 carbon atoms, Ar' is selected from the group consisting of:

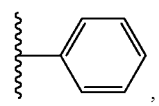

-continued

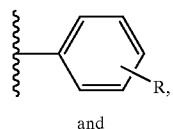

and

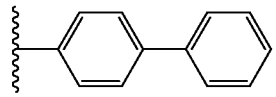

X is selected from the group consisting of:

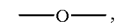

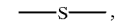

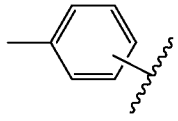

,

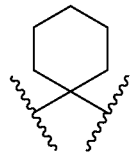

,

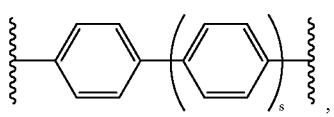

,

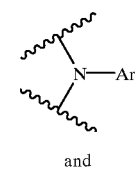

and

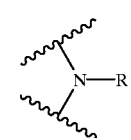

s is 0,1 or 2, and

X' is an alkylene radical selected from the group consisting of alkylene and iso-alkylene groups containing 2 to 10 carbon atoms.

11. An electrophotographic imaging process comprising
(a) providing an electrophotographic imaging member comprising a supporting substrate having an electrically conductive surface; an optional charge blocking layer; an optional adhesive layer; a charge generating layer having two sides and at least two charge transport layers formed on one of said sides of the charge generating layer, each charge transport layer comprising a charge transporting polymer
  (i) comprising a backbone containing charge transporting moieties in said backbone, said moieties having a chemical structure different from the chemical structure of charge transporting moieties in the charge transport polymer of any charge transport layer lying closer to said charge generating layer, and
  (ii) having a higher ionization potential than the charge transport polymer in any charge transport layer lying closer to the charge generating layer
(b) depositing a uniform electrostatic charge on said imaging member;
(c) exposing said imaging member to activating radiation in image configuration to form an electrostatic latent image on said imaging member;
(d) developing said electrostatic latent image with electrostatically attractable marking particles to form a toner image;
(e) transferring said toner image to a receiving member;
(f) cleaning said imaging member; and
(g) repeating said depositing, exposing, developing, transferring and cleaning steps.

12. An electrophotographic imaging process according to claim 11 wherein one of said charge transport layers comprises a charge transporting polyarylamine polymer.

13. An electrophotographic imaging process according to claim 11 wherein one of said charge transport layers comprises a charge transporting polysilylene polymer.

14. An electrophotographic imaging process according to claim 11 wherein said charge generating layer comprises charge generating pigment particles dispersed in a resinous binder.

15. An electrophotographic imaging process according to claim 14 wherein one of said charge transport layers immediately adjacent to said charge generating layer comprises a charge transport polymer having an ionization potential having a value within about 0.15 electron volts of the ionization potential of said generating pigment.

16. An electrophotographic imaging process according to claim 11 wherein the difference between the ionization potentials between charge transport polymers of any two adjacent charge transport layers of said at least two charge transport layers is less than about 0.15 electron volts.

17. An electrophotographic imaging process according to claim 11 wherein one of said at least two charge transport layers is immediately adjacent to said charge generating layer and the ionization potential of said charge transport polymer in said charge transport layer immediately adjacent to said charge generating layer is less than the ionization potential of the charge transport polymer in the other of said layer or layers further away from said charge generating layer.

* * * * *